H. BARBER.
SPRAYING APPARATUS.
APPLICATION FILED JAN. 17, 1919.
1,339,382.
Patented May 11, 1920.
3 SHEETS—SHEET 3.
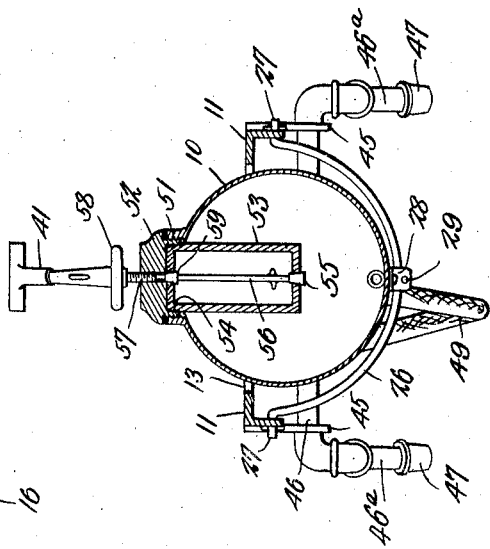
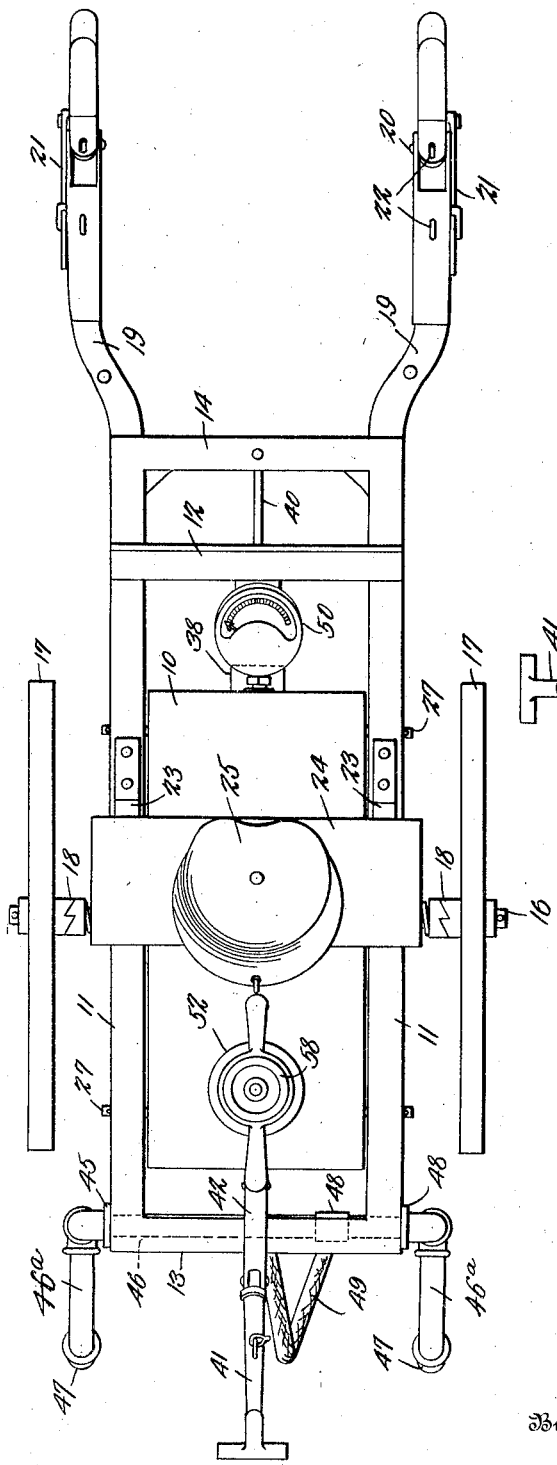
Herman Barber
Inventor

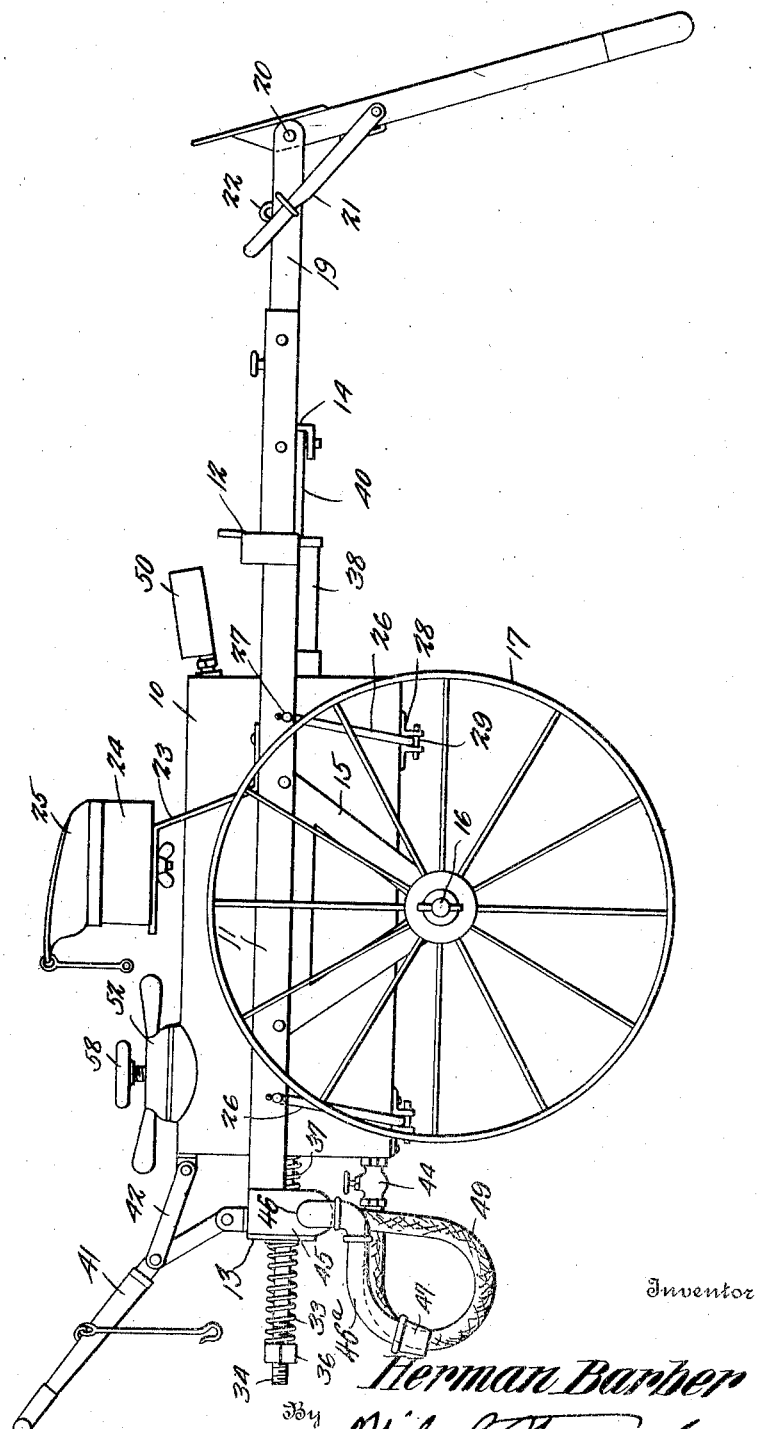

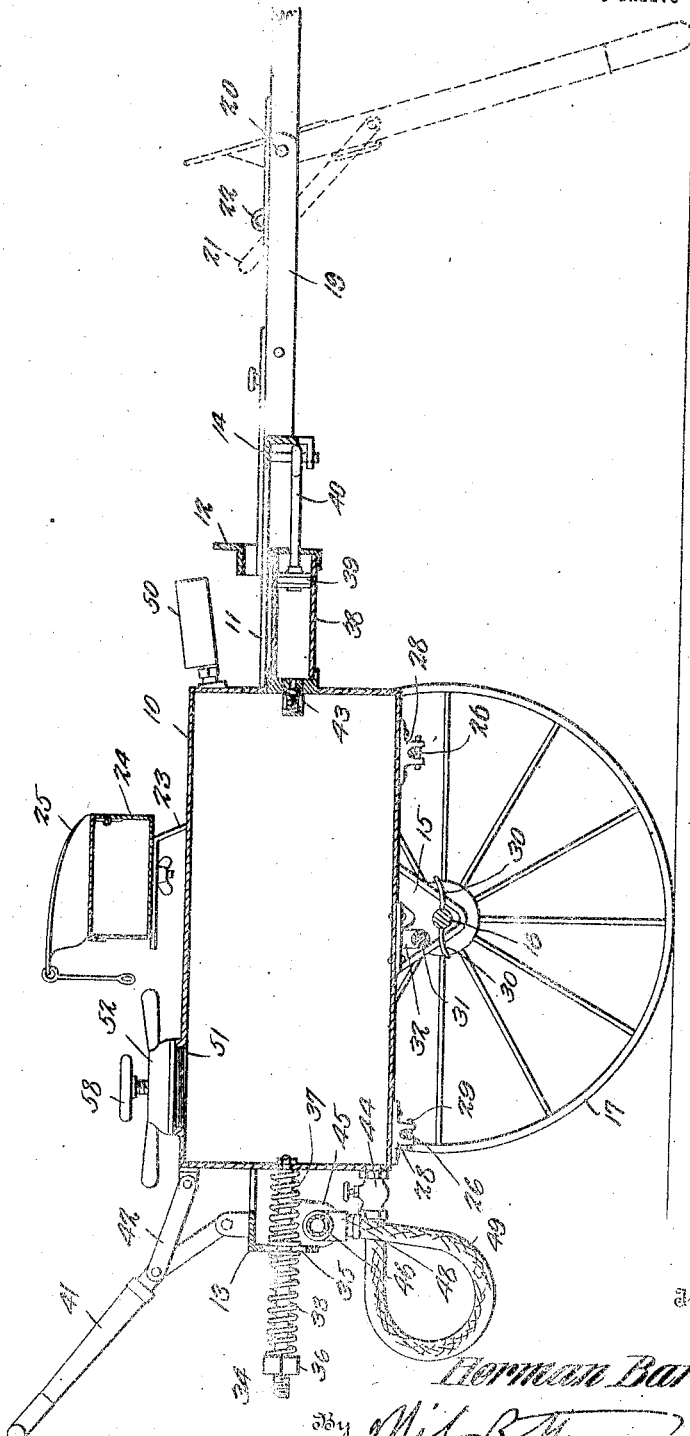

# UNITED STATES PATENT OFFICE.

HERMAN BARBER, OF ELWOOD, INDIANA.

SPRAYING APPARATUS.

1,339,382.

Specification of Letters Patent. Patented May 11, 1920.

Application filed January 17, 1919. Serial No. 271,757.

*To all whom it may concern:*

Be it known that I, HERMAN BARBER, a citizen of the United States, residing at Elwood, in the county of Madison and State of Indiana, have invented new and useful Improvements in Spraying Apparatus, of which the following is a specification.

This invention relates to apparatus for spraying liquids, and its object is to provide a novel and improved portable apparatus of this kind which can be used for spraying plants and trees, and also employed as a chemical fire extinguishing apparatus.

The apparatus is characterized by a tank for holding the liquid to be sprayed, from which tank the liquid is forcibly ejected by air pressure, an air pump being provided which discharges into the tank. This pump is automatically operated when the apparatus is being transported, a wheeled support being provided and the pump being operated by the wheels when the latter are in motion.

Other objects and advantages of the invention will be pointed out in the detailed description appearing hereinafter, and in order that the same may be better understood, reference is had to the accompanying drawings forming a part of this specification.

In the drawings,

Figure 1 is a side elevation of the apparatus;

Fig. 2 is a longitudinal section thereof;

Fig. 3 is a plan view, and

Fig. 4 is a cross section showing a fire extinguishing appliance.

Referring specifically to the drawings, 10 denotes a liquid container in the form of a tank supported in horizontal position by a wheeled frame consisting of laterally spaced, parallel side bars 11 connected by front and rear cross bars 12 and 13 respectively. In front of the cross bar 12 is another cross bar 14 the purpose of which will be presently described. From the side bars 11 depend frame members 15 which support an axle 16 on which are mounted the supporting wheels 17. Pawl-and-ratchet driving connections 18 are provided between the wheels 17 and the axle 16, so that when the wheels are turning in the direction to carry the machine forward, the motion of the wheels is transmitted to the axle, whereas when the wheels turn in the opposite direction they slip and impart no motion to the axle. This driving connection facilitates turning and backing, and as it is a well-known expedient a further description thereof is not deemed necessary.

The forward ends of the side bars 11 are provided with extensions 19 which serve as shafts for attachment of a draft animal. These shaft extensions are in two pivotally connected sections, so that the forward sections may be swung down as shown in Fig. 1, and serve as props for supporting the tank 10 and its frame in horizontal position when the machine is at rest. The pivot of the props is shown at 20, and suitable latch devices 21 are provided for locking the same in downturned position. When the props are up they form continuation of the shafts 19 and they are held in this position by suitable locking devices 22.

The side bars 11 also support standards 23 carrying a tool box 24 having a hinged top on which is a seat 25 for the driver.

The tank 10 is carried in such a manner that it is free to be swung back and forth in the direction of its length. This support is had by means of two bails 26 pivoted to the side bars 11 as shown at 27 and extending transversely therebetween with a downward curve. The tank seats in the bails and has bottom lugs 28 adjacent to its respective ends between which the bails seat and are retained by pins 29 passing through the lugs beneath the bails. The swinging support for the tank therefore permits the latter to be reciprocated in the direction of its length, the bails swinging in parallelism.

In order that the tank 10 may be swung in the manner stated, and for a purpose to be presently made clear, the axle 16 is fitted with tappets 30 which are engageable with an abutment in the shape of a roller 31 supported by a bracket 32 on the tank bottom. Thus, when the axle 16 is in forward motion, the tappets successively strike the roller 31 and force the tank in one direction, and when the tappets clear the roller, the tank is forced back by a spring 33 coiled around a projecting stem 34 fastened to the rear end of the tank and passing slidably through an aperture 35 in the rear cross bar 13. The spring is located between the cross bar and an abutment 36 on the outer end of the stem 34. When the tappets 30 move the tank in one direction, the spring 33 is compressed, and hence it forces the tank back when the tappets clear the roller 31.

A spring 37 is also coiled around the stem 34 between the cross bar 13 and rear end of the tank 10, for cushioning the movement of the tank imparted to it by the tappets 30.

The abutment 36 is a nut screwed on the stem 34, by means of which the tension of the spring 33 may be adjusted.

To the front end of the tank 10 is rigidly connected the cylinder 38 of an air pump, said cylinder therefore traveling with the tank when the latter is reciprocated. In the cylinder works a plunger 39 having a rod 40 projecting from its forward end and anchored to the cross bar 14. It will therefore be seen that the pump is operated by the reciprocatory motion of its cylinder as it moves back and forth with the tank 10, the plunger 39 remaining stationary relatively to the frame by reason of the connection of its rod 40 with the cross bar 14. The pump is arranged to discharge into the tank 10 so that the liquid contents thereof may be discharged by the air pressure thus stored up in the tank. The pump is in operation while the machine is being propelled, and ordinarily, sufficient air-pressure is obtained while the machine is being driven to the place of use. However, in order that the air pump may also be operated manually, a hand-lever 41 is fulcrumed on the cross bar 13 and connected by a link 42 to the rear end of the tank 10. The hand-lever can be disconnected when the pump is being operated automatically as hereinbefore described.

The pump outlet into the tank 10 is provided with an ordinary ball check-valve 43.

The liquid in the tank 10 is thoroughly agitated by the motion of the tank when the latter is reciprocated to operate the air pump, and the jar produced by the motion of the machine when it is traveling also agitates and stirs up the liquid. A further agitation of the liquid is produced by the air forced through the same.

The liquid outlet of the tank 10 is a valve 44.

The cross bar 13 has depending brackets 45 at its ends which rotatably support a horizontal pipe 46 having lateral bends 46ª at its ends which are fitted with spray nozzles 47. As the pipe 46 is rotatable, the nozzles 47 can be turned in various directions to discharge the liquid wherever desired.

The pipe 46 has an inlet 48 adapted to be connected to the outlet valve 44 by a hose 49.

The tank 10 is equipped with a gage 50, and it also has a filler opening 51 which is threaded to receive a closure in the form of a screw plug 52.

When the machine is to be used as a chemical fire extinguishing apparatus, the tank 10 will be filled with the usual soda solution, and an acid receptacle 53 is provided, as shown in Fig. 4. This receptacle will be attached to the plug 52 so that it extends down into the tank, the bottom of the plug having a threaded recess 54 into which the top of the acid receptacle screws.

The bottom of the acid receptacle 53 has an outlet which is closed by a plug valve 55 having a stem 56 which extends through the receptacle to the top thereof, and through an opening in the latter so that its upper end is opposite the inner end of a screw stem 57 threaded through the center of the plug 52 and having an operating hand wheel 58 at its outer end. The upper end of the valve stem 56 also has a plug 59 seating in the opening in the top of the receptacle 53 when the plug 55 is seating in the receptacle outlet.

To operate the apparatus, the screw stem 57 is turned to push the stem 56 downward until the plugs 55 and 59 are unseated, whereupon the acid is released and allowed to drop into the tank 10. A few strokes with the hand-lever 41 will thoroughly agitate the solution. By means of a hose attached to the outlet valve 44 the solution may be directed onto the fire to be extinguished.

The machine is adapted for many uses, and it is simple and devoid of complicated parts liable to get out of order.

I claim:

1. In an apparatus of the kind described, a wheeled supporting frame, a liquid container carried by said frame and supported thereby for a reciprocatory movement, an air pump discharging into the container and having its cylinder connected to the container to move therewith, the pump plunger being held stationary relative to the frame, and means actuated by the wheels of the supporting frame for reciprocating the container.

2. In an apparatus of the kind described, a wheeled supporting frame, a liquid container carried by said frame and supported thereby for a reciprocatory movement, an air pump discharging into the container and having its cylinder connected to the container to move therewith, the pump plunger being held stationary relative to the frame, means actuated by wheels of the supporting frame for forcing the container in one direction, and a spring for returning the container.

3. In an apparatus of the kind described, a wheel supporting frame, a liquid container carried by said frame and supported thereby for reciprocatory movement, an air pump discharging into the container and having its cylinder connected to the container to move therewith, the pump plunger being held stationary relative to the frame, a guide stem extending from the container and engageable with the supporting frame, an abutment on the stem, means actuated by the wheels of the supporting frame for forcing the container in one direction, and a return spring for the container engaging the aforesaid abutment.

4. In an apparatus of the kind described, a wheeled supporting frame, a liquid container carried by said frame and supported thereby for a reciprocatory movement, an air pump discharging into the container and having its cylinder connected to the container to move therewith, the pump plunger being held stationary relative to the frame, an abutment on the container, and tappets actuated by the wheels of the supporting frame and engageable with the abutment for reciprocating the container.

5. In an apparatus of the kind described, a wheeled supporting frame, a liquid container carried by said frame and supported thereby for a reciprocatory movement, an air pump discharging into the container and having its cylinder connected to the container to move therewith, the pump plunger being held stationary relative to the frame, an abutment on the container, and tappets on the axle of the supporting frame and engageable with the abutment for reciprocating the container.

6. In an apparatus of the kind described, a wheeled supporting frame, pivoted parallel bails carried by the frame, a liquid container supported by the bails for a reciprocatory motion, an air pump discharging into the container and having its cylinder connected to the container to move therewith, the pump plunger being held stationary relative to the frame and means actuated by the wheels of the supporting frame for reciprocating the container.

7. In an apparatus of the kind described, a wheeled supporting frame, a liquid container carried by said frame and supported thereby for a reciprocatory movement, an air pump discharging into the container and having its cylinder connected to the container to move therewith, the pump plunger being held stationary relative to the frame, means actuated by the wheels of the supporting frame for reciprocating the container, and means for manually reciprocating the container.

In testimony whereof I affix my signature.

HERMAN BARBER.

Witnesses:
ANNA B. FIELD,
A. J. BEHYMER.